H. LENTZ.
ROTARY ENGINE.
APPLICATION FILED FEB. 23, 1910.
1,043,945. Patented Nov. 12, 1912.
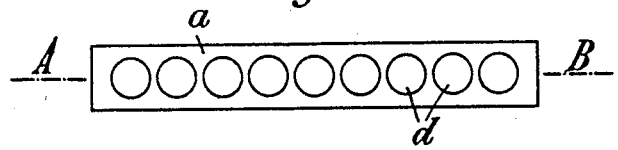
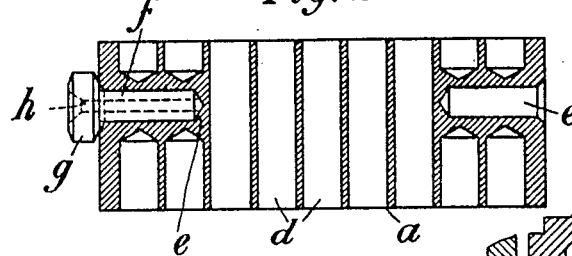
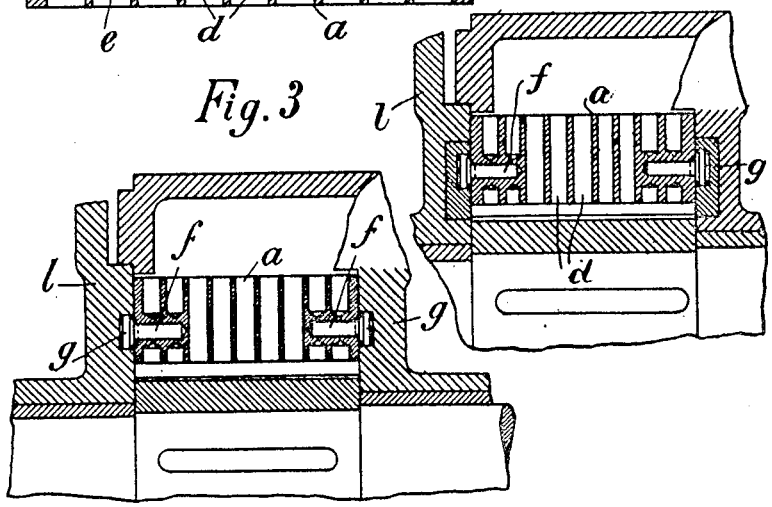
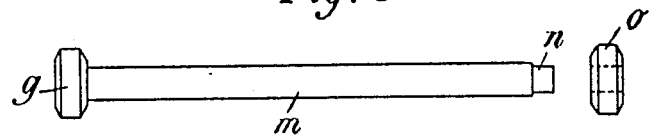
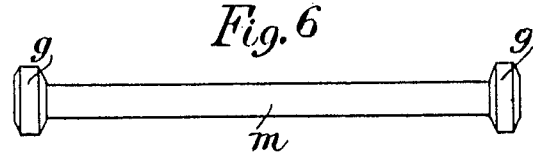
WITNESSES.
INVENTOR,
HUGO LENTZ,
by
ATTORNEY.

UNITED STATES PATENT OFFICE.

HUGO LENTZ, OF MANNHEIM, GERMANY.

ROTARY ENGINE.

1,043,945.  Specification of Letters Patent.  Patented Nov. 12, 1912.

Application filed February 23, 1910. Serial No. 545,357.

*To all whom it may concern:*

Be it known that I, HUGO LENTZ, engineer, citizen of Germany, residing at 42 Keplerstrasse, Mannheim, Germany, have invented a new and useful Improvement in Rotary Engines; and I do hereby declare the following to be a full, clear, and exact description of the same.

My invention relates to rotary engines in which the radially moving piston vanes are guided by means of cam paths or grooves in the ends or covers of the casing, and my invention has for its object to improve this guidance to make it more economical in power and better adapted to meet the various requirements as regards friction and movement of the parts one on another, than was hitherto the case.

In rotary engines in which one or more abutments are provided in a cylindrical casing and a piston with radially movable vanes rotates in the casing, the greatest difficulty is caused in guiding the vanes in such a way as to allow of their deflection at the abutments, so as to avoid their wear and tear, which would affect their good fitting and the permanent steady running of the engine.

The problem which I have set myself to solve, and the proposition of which together with its solution form the essential features of my invention, is, with the foregoing in view, to find a means of guidance which allows of a long journal surrounded by bearing material and also a narrow roller of the smallest admissible diameter for the guidance in the cam path. The solution of the problem consists in a pin, for instance of steel, being inserted in the vane which is composed of a suitable bearing material, which pin is continued by a head of the smallest admissible width and diameter running as a roller in the cam path, which head may be smaller than that of a roller which is mounted on a pin. With the high speed of these rollers it is especially necessary that they run in the bearing material of the piston vanes. As, however, the latter in addition to the requirements of good fitting and light weight must be suitable for obtaining the smallest possible centrifugal force, all these conditions are best fulfilled if the piston vanes are composed entirely of a bearing material which corresponds to all these requirements, such as, for instance preferably cast iron or bronze first, o second compressed fiber.

By my invention a permanently good and certain action even with high pressures and a very high speed is obtained and therefor the scope of employment of rotary engine extraordinarily enlarged.

An example of construction of my inven tion is shown in the accompanying drawing in which, Figure 1 is a plan view of a piston van of bearing material, provided with cylindri cal recesses and two rollers; Fig. 2 is a sec tion on the line A—B of Fig. 1; Fig. 3 is fragmentary vertical section of the rotar piston with inserted vane. Fig. 4 is a mod fication of Fig. 3; Fig. 5 is a double-ende roller which is passed through the enti length of the vane and has roller heads a both ends. Fig. 6 is a modification o Fig. 5.

The piston vane *a* shown in Figs. 1 an 2 is of rectangular form and made of a ligl bearing material such for instance as com pressed fiber.

In order to reduce the weight and di placement of fluid in moving the van against the periphery of the casing, perfor tions *d* are provided. At each end the var is formed as a socket *e*, in each of whic sockets a roller *f* is inserted which is pr vided with a steel head *g* and may be pr vided with a lubricating passage *h*. Tl groove for the steel head *g* may either l formed directly in the side cover of tl rotary engine, as shown in Fig. 3, or a sep rate plate containing the groove may be i serted in the casing 1 (Fig. 4).

In place of the two separate rollers continuous pin *m* (Fig. 5) may be arrange which has at one end a steel head *g* simil to that in the foregoing figures, while the other end a steel head *o* is forced otherwise fitted on its turned end *n*. Bo heads may also be mounted firmly at fi on the pin Fig. 6, only then the vane m be divided similar to a bearing.

I claim as my invention:

1. A rotary engine having piston vanes and cam paths fashioned in the end walls and covers of the engine for guiding said piston vanes.

2. In a rotary engine, a piston vane having perforations passing therethrough, cam paths fashioned in the end walls and covers of the engine, sockets in the ends of the vanes, pins inserted in said sockets and engaging the cam paths.

In testimony whereof, I have signed my name to this specification in the presence of two subscribing witnesses.

HUGO LENTZ.

Witnesses:
 ERNEST L. IVES,
 W. W. HELMITZ.

Copies of this patent may be obtained for five cents each, by addressing the "Commissioner of Patents, Washington, D. C."